(12) United States Patent
Bodapati et al.

(10) Patent No.: US 11,531,846 B1
(45) Date of Patent: Dec. 20, 2022

(54) EXTENDING SENSITIVE DATA TAGGING WITHOUT REANNOTATING TRAINING DATA

(71) Applicant: Amazon Technologies, Inc., Seattle, WA (US)

(72) Inventors: Sravan Babu Bodapati, Bellevue, WA (US); Rishita Rajal Anubhai, Seattle, WA (US); Pu Paul Zhao, Seattle, WA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 637 days.

(21) Appl. No.: 16/587,471

(22) Filed: Sep. 30, 2019

(51) Int. Cl.
*G06K 9/62* (2022.01)
*G06F 9/54* (2006.01)
*G06N 20/00* (2019.01)
*G06N 5/04* (2006.01)

(52) U.S. Cl.
CPC ........... *G06K 9/6259* (2013.01); *G06F 9/541* (2013.01); *G06K 9/6277* (2013.01); *G06N 5/04* (2013.01); *G06N 20/00* (2019.01)

(58) Field of Classification Search
CPC .... G06K 9/6259; G06K 9/6277; G06N 20/00; G06N 5/04; G06F 9/541

USPC .......................................................... 706/12
See application file for complete search history.

(56) References Cited

U.S. PATENT DOCUMENTS

| | | | |
|---|---|---|---|
| 2019/0042988 A1* | 2/2019 | Brown | G06N 5/022 |
| 2019/0327271 A1* | 10/2019 | Saxena | G06N 20/00 |
| 2019/0362290 A1* | 11/2019 | Rogynskyy | G06Q 10/06393 |
| 2020/0175961 A1* | 6/2020 | Thomson | G10L 15/28 |
| 2020/0311300 A1* | 10/2020 | Callcut | G06F 21/602 |
| 2020/0372075 A1* | 11/2020 | Rogynskyy | H04L 51/48 |
| 2020/0387819 A1* | 12/2020 | Rogynskyy | G06N 20/00 |
| 2020/0403818 A1* | 12/2020 | Daredia | G06N 20/00 |

* cited by examiner

*Primary Examiner* — Kenneth Tang
(74) *Attorney, Agent, or Firm* — Nicholson De Vos Webster & Elliott LLP

(57) ABSTRACT

Techniques for extending sensitive data tagging without reannotating training data are described. A method for extending sensitive data tagging without reannotating training data may include hosting a plurality of models at a model endpoint in a machine learning service, each model trained to identify a different sensitive data type in a transcript of content, adding a new model to the model endpoint, the new model trained to identify a new sensitive data entity in the transcript of content, identifying sensitive entities in the transcript by each of the plurality of models and the new model, merging inference responses generated by each of the plurality of models and the new model using at least one inference policy, and returning a merged inference response identifying a plurality of sensitive entities in the transcript.

20 Claims, 10 Drawing Sheets

US 11,531,846 B1

EXTENDING SENSITIVE DATA TAGGING WITHOUT REANNOTATING TRAINING DATA

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. Protection of sensitive data, such as personally identifiable information (PII), payment card information (PCI), protected health information (PHI), etc. is an important concern of application developers, both from a regulatory standpoint and to maintain user trust.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for extending sensitive data tagging without reannotating training data. Transcriptions of content, such as image data, audio data, etc., may include sensitive data, such as personally identifying information (PII), payment card information (PCI), protected health information (PHI), and other sensitive data. Embodiments may use Deep Neural Network models to identify sensitive data entities in transcripts. However, such models cannot be readily be progressively trained due to catastrophic interference, which may lead to a neural network forgetting previously learned information upon learning new information. As such, to add a new sensitive data entity, the model would need to be retrained from scratch, which would require annotating the original training data with the new entity. Such manual annotation is cumbersome and costly. Additionally, access to the original training data may be lost over time, making retraining the model impossible.

In some embodiments, a user can send a request to start a new transcription job and select one or more sensitive entities that are supported to be redacted. To add support for redacting a new sensitive entity, a new model may be trained on new training data specifically to identify that new sensitive entity. A model endpoint in a model hosting system can maintain a different model for each sensitive entity being redacted. When a new model is trained it can be deployed to the model endpoint and made available for the user to select for redaction on their next transcription job. Each model can perform inference on the transcript to identify sensitive entities for redaction. The inference response from each of the models can be merged, and any text spans in the transcript that have conflicting sensitive entities identified can be resolved using inference policies.

Figure 1:
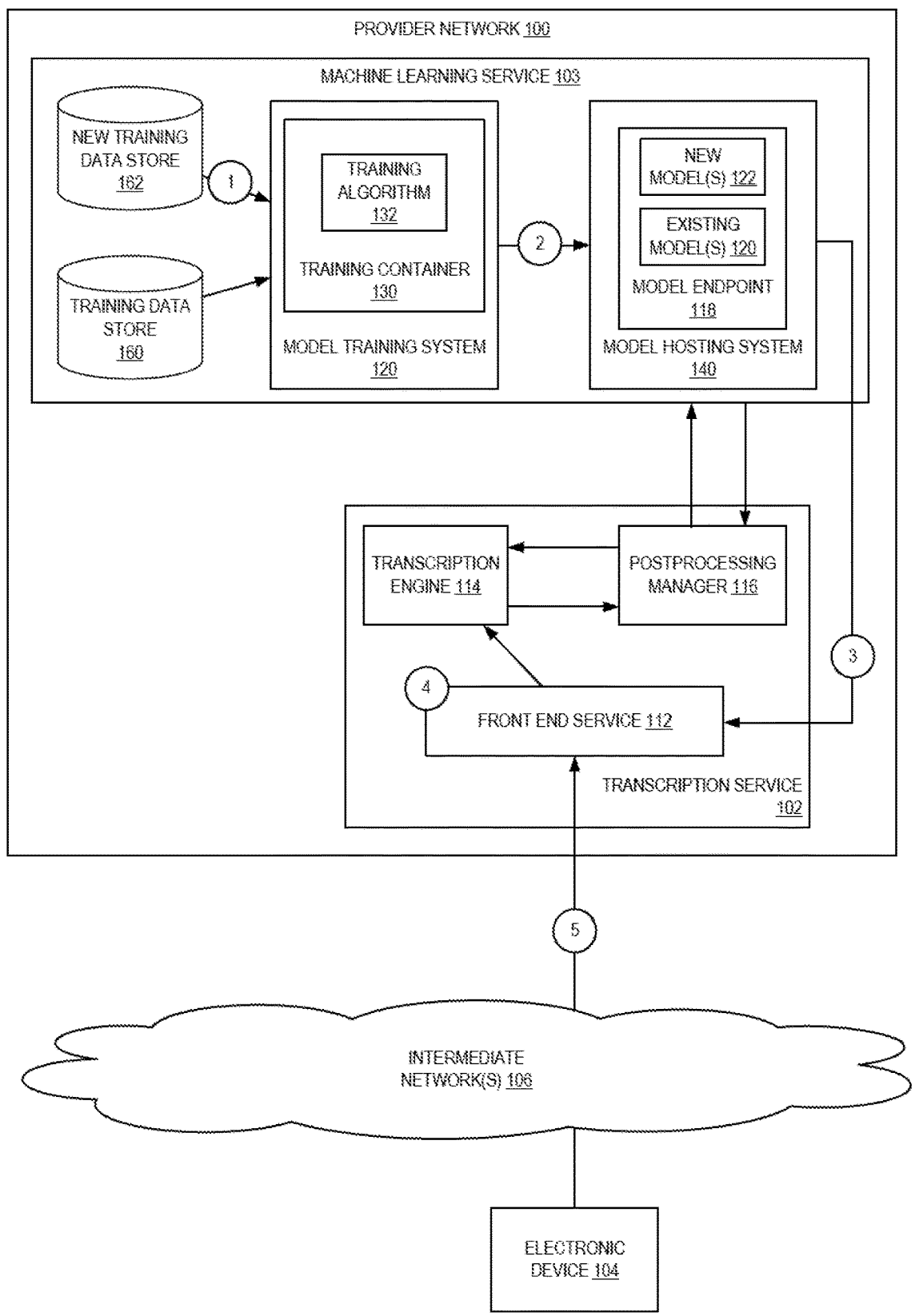
FIG. 1 is a diagram illustrating an environment for extending sensitive data tagging without reannotating training data according to some embodiments.

FIG. 1 is a diagram illustrating an environment for extending sensitive data tagging without reannotating training data according to some embodiments. A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. The interface(s) may be part of, or serve as a frontend to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As shown in FIG. 1, provider network 100 can include a transcription service 102. Transcription service 102 may include a speech-to-text service, an image-to-text service, or other content-to text service. The content being transcribed may include sensitive data, such as names, addresses, account numbers, social security numbers, payment card industry (PCI) data, protected health information (PHI), or other personally identifying information (PII). Maintaining the security of this sensitive data is important both to comply with regulatory requirements and to maintain the trust of users. To protect sensitive data, the transcription service can provide an option to redact sensitive information in the request to start a new transcription job. For example, the transcription service 102 can provide an application programming interface (API), such as a StartTranscriptionJob API, which includes a content redaction field whose value is a Boolean that can be set by the user. If the user wants content redaction, then this field can be set to "TRUE". In some embodiments, the StartTranscriptionJob API may include an option for the user to request both a redacted and unredacted transcript. For example, the customer may use their own internal access control system to control access to the redacted information and may request copies of both to maintain in their own system. In some embodiments, the StartTranscriptionJob API may include options for which types of sensitive data the user wants redacted. For example, the API may include a plurality of fields, each corresponding to a different sensitive data type or subtype. In the initial request, the user can set fields to true for the data types the user wants redacted.

The transcription service 102 can send a transcript to a machine learning service 103 to identify entities to be redacted. The machine learning service may include a model hosting system 140 which includes a model endpoint 118 that may host one or more existing machine learning models 120. In some embodiments, the transcript can be sent to model endpoint 118 in pieces. For example, the transcript may be divided into portions based on number of characters (e.g., 5000 characters at a time, or other configurable size). Model endpoint 118 can host a plurality of models that identify sensitive data entities in the transcript. In some embodiments, the model endpoint may include a plurality of models, where each model corresponds to a different type of sensitive data that is to be redacted. For example, a first model at the model endpoint may be trained to identify names, a second model may be trained to identify addresses, a third model may be trained to identify account numbers, etc.

The existing machine learning models 120 may have been trained by a model training system 120. The model training system can obtain training data from a training data store 160 to train the models hosted by model hosting system 140. The training data store 160 may include training data that has been annotated for one or more sensitive entities that the existing models are to be used to identify. The model training system 120 can include a training container 130 that includes various resources required to train models, including one or more training algorithms 132. Once the models have been trained, the model training system can output the models to model endpoint 118 where they can service requests from transcription service 102.

In some embodiments, the types of sensitive data which may be redacted are limited to the types of sensitive data that have corresponding existing models 120. Attempting to extend the existing models to identify new sensitive entities would require extensive reannotation of the training data in training data store 160, and would risk catastrophic interference, where the existing models 120 forget what was previously learned when trained to identify new sensitive entities. As such, in some embodiments, to extend the sensitive data types that are supported for redaction, new models 122 can be trained for new sensitive data types. As discussed, each newly supported sensitive data type may have a corresponding new model. The new model can be trained by the model training system 120 using new training data obtained from new training data store 162, at numeral 1, that has been labeled with the new sensitive data entities which the new model will be trained to identify. In some embodiments, the new training data may be stored along with the old training data in the same data store. In some embodiments, the new and/or old training data can be stored in a storage service accessible to the machine learning service.

Once the new model 122 has been trained, it can be deployed to the model endpoint 118, at numeral 2. As discussed, the model endpoint 118 can host multiple models. When a transcript, or portions of a transcript, are sent to the model endpoint, the data can be passed to each of the hosted models in parallel. Each model can provide its inference response, in which it labels each span of text in the transcript as either "other" or as the sensitive data entity that model was trained to identify. The results can be merged into a single inference response, and the response can be returned to the transcription service 102 to generate the redacted transcript based on the inference response. In some embodiments, for each entity, the model endpoint can return the sensitive data type (e.g., name, address, credit card number, etc.) and a byte offset corresponding to a location of the entity in the transcript. The inference response can aggregate the sensitive entities identified for the entire transcript and can be returned once the entire transcript has been processed by the model endpoint.

At numeral 3, the model hosting system can send a message to the front end service indicating that a new sensitive data entity is now supported. At numeral 4, the front end service can update its interface, such as an application programming interface, to include an option to redact the new sensitive data entity in future requests. For example, at numeral 5, a new transcription request can be received from a user of electronic device 104. The new transcription request can indicate whether a redacted transcript is to be generated. If a redacted transcript is to be generated, the newly added sensitive data type will be redacted along with the pre-existing supported sensitive data types. In some embodiments, the user may select which sensitive data types are to be redacted from among the currently supported sensitive data types, including the newly added sensitive data type and the pre-existing sensitive data types.

Figure 2:
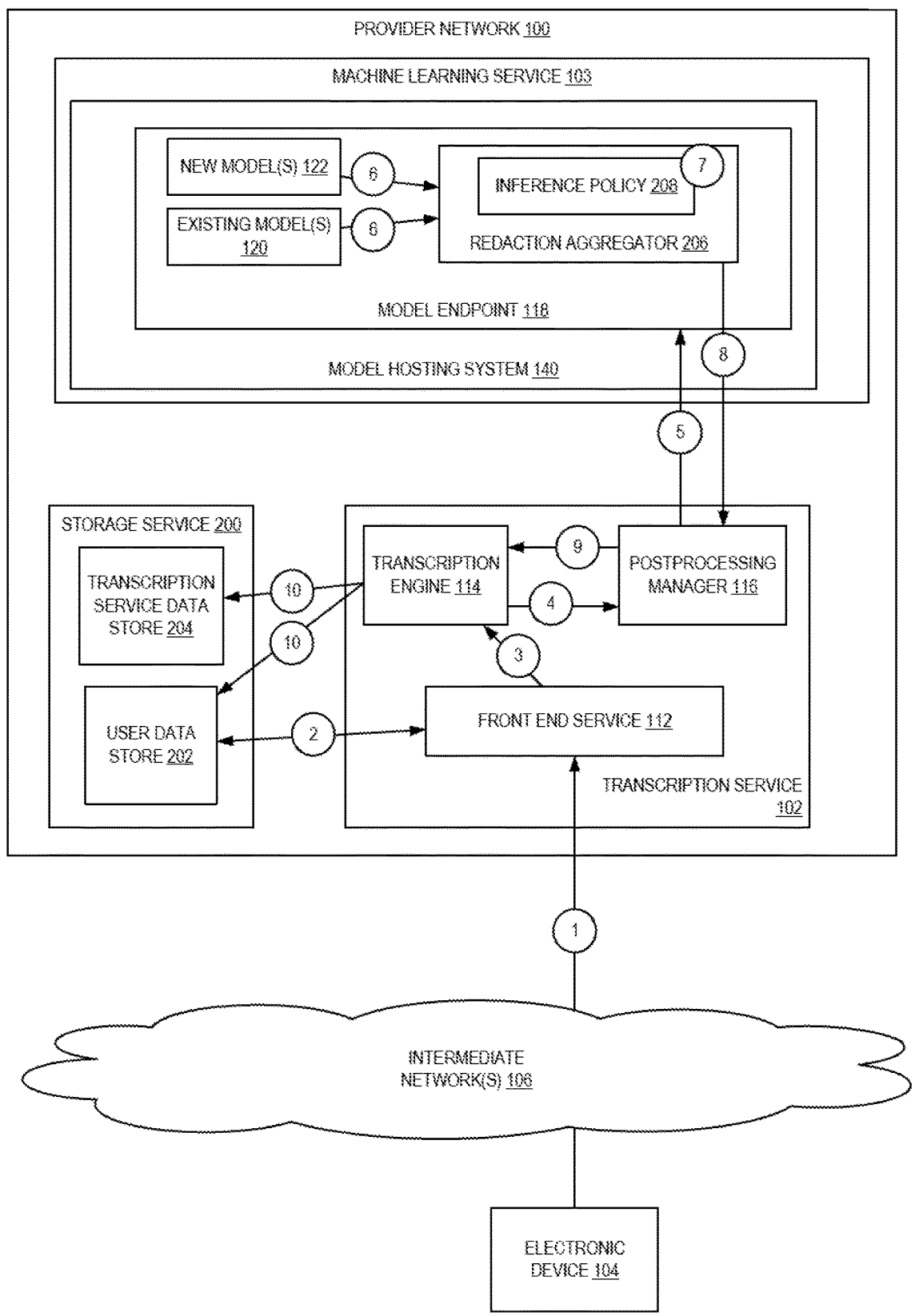
FIG. 2 is a diagram illustrating an environment for resolving conflicting sensitive data entity identification according to some embodiments.

FIG. 2 is a diagram illustrating an environment for resolving conflicting sensitive data entity identification according to some embodiments. As shown in FIG. 2, at numeral 1, a user, using electronic device 104, can send a request to perform a transcription job on content. In some embodiments, the request can include the content to be transcribed. Alternatively, in some embodiments, the request can include a reference to the content to be transcribed, such as a reference to a storage service to which the content was previously uploaded. At numeral 2, a front end service 112 of the transcription service can use the reference (such as a URL, URI, or other reference) to obtain the content from a user data store 202 in which the content is stored. In some embodiments, the user data store 202 may be implemented in a storage service 200 in provider network 100.

After a new request to start a transcription job is received, and the content to be transcribed has been obtained, the front end service can send the content to a transcription engine 114, at numeral 3. The transcription engine can perform content transcription on the received content. This may include analyzing an audio file to perform speech-to-text processing, analyzing an image file to perform image-to-text processing, or other content-to-text processing. The transcription engine 114 can output the transcript to postprocessing 116 to perform various postprocessing steps on the transcript at numeral 4. For example, in speech-to-text, the postprocessing may include number normalization (e.g., e.g., determine whether "eleven fifteen" should be represented as 11:15, 11/15, eleven fifteen, etc. depending on context) and punctuation. Additionally, content redaction may be performed as a postprocessing step. In some embodiments, content redaction may be performed as a last step of postprocessing. In some embodiments, once postprocessing is complete, except for content redaction, the unredacted transcript is complete and can be stored in a transcription service data store 120. This unredacted transcript can be stored in this data store to control access to the unredacted transcript.

At numeral 5, content redaction may begin by sending the unredacted transcript to a model endpoint 118 of a model hosting system 140 in a machine learning service 103. As discussed, the model endpoint 118 can include a plurality of models, including the existing models 120 and the newly added models 120, each model from the existing models and the newly added models can identify a different sensitive data entity in the text of the transcript. When the transcript is sent to the model endpoint, it can be distributed to each of the models, which can perform inference in parallel. At numeral 6, the models can return their inference responses to redaction aggregator 206. The inference response from each model can indicate, for each span of text in the transcript, whether that span is a sensitive data element or if it is not a sensitive data element. For example, if the text includes:

Sravan, working at 1800 9th Avenue lives in Seattle

Then the response from a model trained to identify names may return:

[NAME] O O O O O O O

Where the name "Sravan" has been tagged by the model as a sensitive data entity, and the other spans have been tagged "O" indicating other (e.g., not a name). Similarly, a model trained to identify addresses may return:

O O O [ADDR] [ADDR] [ADDR] O O O

This indicates that the spans corresponding to 1800 $9^{th}$ Avenue have been identified as address sensitive data entities, and the other spans have been indicated as not address entities.

Redaction aggregator can merge the inference responses generated by each model based on one or more inference policies 208 at numeral 7. Because each model is separately tagging entities in the transcript, when the results are merged some entities may be tagged by multiple models. Inference policies 208 provide a way to resolve conflicts between the inference responses where a single entity is tagged multiple times. For example, a policy may select the tag with the higher confidence score to resolve the conflict. In another example, where there are overlapping spans tagged by multiple models, the union of those overlapping spans may be redacted and both tags may be applied to the redacted entity. In another example, a policy may review a number of spans on either side of the span with the conflict to determine if the context suggests selecting one of the tags. For example, if the text reads "Sravan, working at 1800 9 th Avenue lives in Seattle", and the span "9" is tagged as both an age entity and an address entity, the inference policy may review the spans "1800", "th", and "Avenue", which are tagged as address entities. Because the conflicted span (e.g., "9") is surrounded by address entities, the address tag may be adopted to resolve the conflict. In some embodiments, such a policy may be applied if the confidence scores of the conflicting tags are within a threshold difference, and the policy may define a number of spans to review on either side of the conflicted span.

At numeral 8, the merged results can be returned to the postprocessing manager 116. The postprocessing manager 116 can send the inference response to the transcription engine 114 at numeral 9. The transcription engine can identify the entities in the transcript based on the byte offsets of the entities in the inference response and replace each entity in the redacted transcript with a universally unique identifier. In some embodiments, the transcription engine can output a data structure that includes each redacted entity and provides the entity type, the start time and end time of the entity in the content, and the content of the redacted entity. In some embodiments, the transcription engine can additionally replace each entity with its sensitive data type. For example, the original transcript before redaction may include: "My name is Tom. My age is 23. My sister's name is Sara. Her age is 12". And after redaction, the redacted transcript may include: "My name is <NAME>1111. My age is <AGE>1112. My sister's name is <NAME>1113. Her age is <AGE>1114". In this example, each sensitive entity is replaced with "<sensitive data type>UUID." At numeral 10, copies of the redacted transcript can be stored in both the user data store 110, from which the user can retrieve the redacted transcript, and the transcription service data store 120, where the redacted transcript and the unredacted transcript may be used to retrieve entity values in response to a request from the user. In some embodiments, the redacted entities may be stored with the corresponding confidence scores that were found by the models for each redacted entity.

Figure 3:
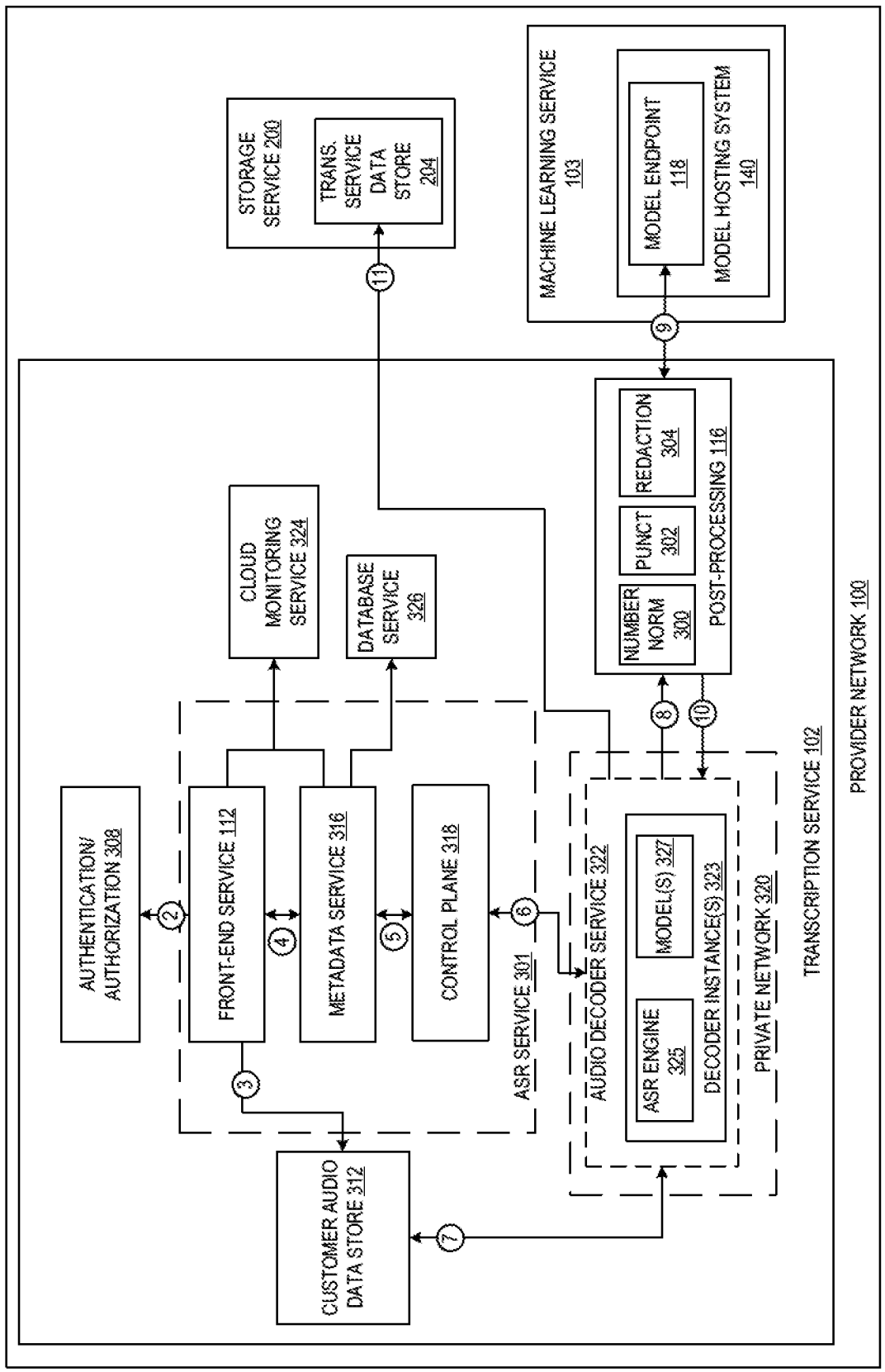
FIG. 3 is a diagram illustrating an example architecture for redacting sensitive data in transcriptions according to some embodiments.

FIG. 3 is a diagram illustrating an example architecture for redacting sensitive data in transcriptions according to some embodiments. In the embodiment of FIG. 3, transcription service 102 may be an automatic speech recognition (ASR) service 301, according to some embodiments. Such an ASR service can be implemented in and/or provided by a provider network 100. As shown in FIG. 3, a front-end service 112 can receive audio recognition and customized model building requests. As shown at numeral 1, a request from a client device can be sent to front-end service 112 via one or more intermediate networks 106. In some embodiments, the front-end service 112 is responsible for at least one of: authentication and authorization 308; publishing ASR job details such as execution time, pending time, etc., to a call-recording and log-monitoring service; throttling APIs at a configurable rate; communicating with the Metadata Service 316 to submit user requests and returns the status of jobs to the customer; returning transcripts (e.g., a pre-signed virtualized storage service Uniform Resource Locator (URL)) to the users when results are available; and/or providing whitelist functionality. For example, at numeral 2, front-end service 112 can authorize and/or authenticate the request received from an electronic device. In some embodiments, the request can include a reference to an audio file stored in customer audio data store 312, which may have been previously uploaded by electronic devices, generated by other entities/services within the provider network 100, etc. Various languages may be supported, including English and Spanish speech-to-text conversion in batch and real-time. An ASR 325 provides accurate transcription for 8 Khz (telephony quality) audio, 16 Khz (HD voice) audio, or better. This allows both high fidelity recordings, as well as lower quality telephony recordings common in call center systems, to be transcribed. In some embodiments, the reference to the audio file may be provided through an API. The reference may be to a single audio file or a batch of audio files stored in customer audio data store 312.

At numeral 3, front-end service 112 can confirm access to the customer audio data store 312 using permissions or other metadata provided in the request. Metadata service 316 encapsulates interactions with a storage layer, e.g., database service 326. At numeral 4, the authenticated and/or authorized request from the electronic device can be passed to metadata service 316. In some embodiments, the metadata service 316 is responsible for at least one of providing functionality to describe/list customer requests; fetching lists of pending jobs and track job status; throttling and caching to ensure that the storage layer is not overwhelmed; and/or maintaining limits for the number of resources, jobs, etc., per account. In some embodiments, metadata service 316 and/or front-end service 112 can output logs to cloud monitoring service 324. The logs may include data such as a job completion time, a number of pending jobs, a number of jobs per account, etc.

Once the metadata service 316 has confirmed that the request can be performed, at numeral 5 the request is passed to the control plane 318. Control plane 318 can perform job orchestration. In some embodiments, control plane 318 may add jobs to a job queue, for example using a queue service. Audio decoder service (ADS) 322 can poll the queue for new jobs at numeral 6. Once a new job is identified (e.g., a message identifying the job is received from the queue), audio decoder service 322 can download the corresponding customer audio file at numeral 7 and validate the audio file (e.g., determining the audio file is of an appropriate format and/or quality and provisioning a decoder instance 323 for audio decoding). Once validation is successful, the customer audio file can be passed to the ASR engine 325, which may be running on the same decoder instance. The audio decoder service can monitor the ASR engine for results (e.g., by polling a directory on the decoder instance to which the output results are stored). In some embodiments, the Control Plane can run in a private network on a hardware virtualization service instance. The ADS account may own the queue through which the control plane sends jobs to the service. A queue publishing role can be created in the ADS account which allows publishing messages to this queue and this role can be granted to the control plane. The control plane may be the only service which interacts with the ADS through the queue using the queue publisher role created in the ADS account.

As discussed further below, to improve isolation of customer data the decoder instance 323 may be provisioned to a private network 320. When decoding is complete, at numeral 8 the resulting transcript may be output to postprocessing manager 116. As discussed, postprocessing manager 116 can execute various postprocessing tasks on the transcript. For example, number normalization 300 can be performed on the transcript, and the transcript can be punctuated 302. In some embodiments, various filters may be applied to the transcript, such as a profanity filter, etc. Once the other postprocessing tasks have been performed, redaction 304 of the transcript may be performed. As discussed, at numeral 9, the transcript can be sent to model endpoint 118, at numeral 9. In some embodiments, the transcript can be sent to model endpoint 118 in pieces. For example, the transcript may be divided into portions based on number of characters (e.g., 5000 characters at a time, or other configurable size). In response, an inference response including a plurality of sensitive entities can be identified by entity type and byte offset and returned to postprocessing manager 116. The inference response can aggregate the sensitive entities identified for the entire transcript and can be returned once the entire transcript has been processed by the model endpoint. At numeral 10, the postprocessing manager 116 can send the inference response to the ASR engine 325 to identify the entities corresponding to each byte offset. The ASR engine 325 can replace each sensitive entity with a UUID and/or entity type to generate the redacted transcript. At numeral 11, the redacted transcript can be stored in transcription service data store 204 and the job can be marked as complete in the metadata service.

In some embodiments, the audio decoder service monitors usage for metering purposes and can send a notification to the requestor to indicate job completion. The transcript can be returned which includes a timestamp for each word so that the transcript can be aligned to the audio source file. Timestamping provides the ability to search and index a library of audio and video assets; thus, one can search for a particular word in the speech-to-text transcription and locate it in the original recording.

In some embodiments, during transcription an ASR engine 325 searches through a language model (LM) 327 by incrementally generating hypotheses based on incoming audio data. The set of hypotheses is then reduced and simplified by a process called determinization. Since larger LMs tend to yield more hypotheses, determinization time increases with LM size. In some embodiments, determinization occurs after all audio has been ingested, meaning that it contributes directly to user-perceived latency. In some embodiments, an online determinization algorithm can proceed incrementally along with the search thereby reducing user-perceived latency.

As generating hypotheses by searching through a very large language model may be time consuming, in some embodiments ASR engine 325 can generate hypotheses from a smaller LM first. The ASR engine 325 then re-ranks these against a larger LM with the same vocabulary. For example, the phrases "black see" and "black sea" are both necessarily valid search hypotheses for some audio data. A unigram LM (a language model based on single-word frequencies, say in the English language) would rank "black see" first, since "see" is more common than "sea." However, a larger bigram LM based on frequencies of pairs of words would rank "black sea" first since it is a common phrase.

Typically, for rescoring a smaller LM is used by the ASR engine 325 in the "first pass" search to construct the initial set of hypotheses. These are then rescored using a larger LM to generate the final hypotheses. This rescoring method adds latency for the second pass, and it is appropriate for offline dictation use cases but not for messaging. Instead, on-the-fly rescoring can be implemented for messaging. Hypotheses from the smaller LM search are rescored by the larger LM right at the time that the search hypotheses are generated. In addition, since the rescoring model is available during the search itself, pruning of hypotheses can be more effective, which can add lower latency to the decoder.

In some embodiments, the control plane 318 of the ASR service can continually scan a data store for a list of jobs to be performed. When one or more jobs are detected, a workflow can be started to perform the transcription. A new instance including an ASR engine can be started for each job. The ASR engine 325 can convert the audio format of the file (or batch of files) to WAV. In some embodiments, the ASR engine can pass the WAV audio through an acoustic model to break the WAV file into a series of words. In some embodiments, models 327 may include one or more language models and an acoustic model. Some of these series of words may represent sentences, some may not be intelligible. To further refine this output, it can be passed through a LM. The LM includes grammar rules, language constructs, and other language-specific nuances. In some embodiments, the LM can include a custom glossary that includes jargon or other domain specific words or phrases. The LM analyzes the input and determines whether the series of words makes sense in the language of the LM. For example, the output includes a plurality of hypotheses associated with each resulting sentence (or series of words). The hypotheses include a confidence value indicating how likely the ASR engine 325 believes the sentence to be correctly transcribed. In some embodiments, when the audio file includes multiple speakers, each speaker's portion can be tagged with the speaker. Each speaker's tagged audio can then be processed by ASR engine 325, and then the result is punctuated and normalized. Normalization may include determine the formatting of language (e.g., determine whether "eleven fifteen" should be represented as 11:15, 11/15, eleven fifteen, etc. depending on context).

In some embodiments, the acoustic model can be trained using longer sentences (e.g., two minutes or longer sentences). In some embodiments, the acoustic model may be a long-short term memory (LSTM) neural network, though in other embodiments other machine learning models (e.g., neural networks such as recurrent neural networks (RNNs)) may be used. Audio input can be segmented into two-minute chunks which may extend past two minutes until a first silence is detected. In some embodiments, training may be performed continuously. In such embodiments, transcription performance can be compared against the audio processed previously (e.g., in a past day or other prior time period) to identify any gaps in accuracy as a function of genres, acoustic properties, customer etc. Data may then be selected from a corpus of audio data (e.g., existing data sets and data captured from customers), and used to train the acoustic model to improve accuracy. The training loop may be performed continuously, daily, weekly, or according to another schedule to maintain accuracy of the acoustic model.

As described herein, neural networks may be utilized in some embodiments. A neural network may include multiple of layers of nodes, including hidden layers. A hidden layer may include nodes that are linked with incoming and outgoing connections. These connections may be weighted. Data can be passed through these layers to generate an output of the neural network. Neural networks can learn as data is provided to them, adjusting the weights associated with the various connections each time new data is presented. Training the acoustic model based on a training dataset may be performed iteratively. The neural network adjusts the weights to identify the correct words spoken in input audio samples. In some embodiments, training may include supervised and/or unsupervised training phases. As training data is passed through the base model, words spoken in the training data are classified. During supervised training, feedback on whether the words have been correctly identified can be received from one or more computing devices or services.

In some embodiments, the correct classifications can be compared to the output of the neural network's final layer. Based on this comparison, differences between the output and the correct classifications can be back-propagated to previous layers of the neural network. This feedback can be modified based on a transfer function associated with the neural network and/or between these layers (e.g., using the derivative of the transfer function) and used to modify the weights associated with the connections. In some embodiments, a delta rule, such as a gradient descent learning rule, can be used to for updating the weights of the inputs to artificial neurons in a neural network. In some embodiments, training may use one or more machine learning libraries.

During training of a neural network, one or more parameters (sometimes referred to as "hyperparameters") may be set, such as by a user or machine learning process. These hyperparameters may include hidden units, learning rate, momentum, weight, maximum norm, batch size, maximum tries, maximum iterations, etc. By adjusting these parameters, the amount of change to the neural network from feedback (e.g., changes to weights for the connections) can be increased or decreased. This may affect both how quickly the neural network learns the training material and how accurately the neural network performs. For example, momentum adds part of the previous weight to the current weight of a given connection. By adjusting the momentum, the neural network can avoid settling in a local minimum during training or missing the minimum during training.

Figure 4:
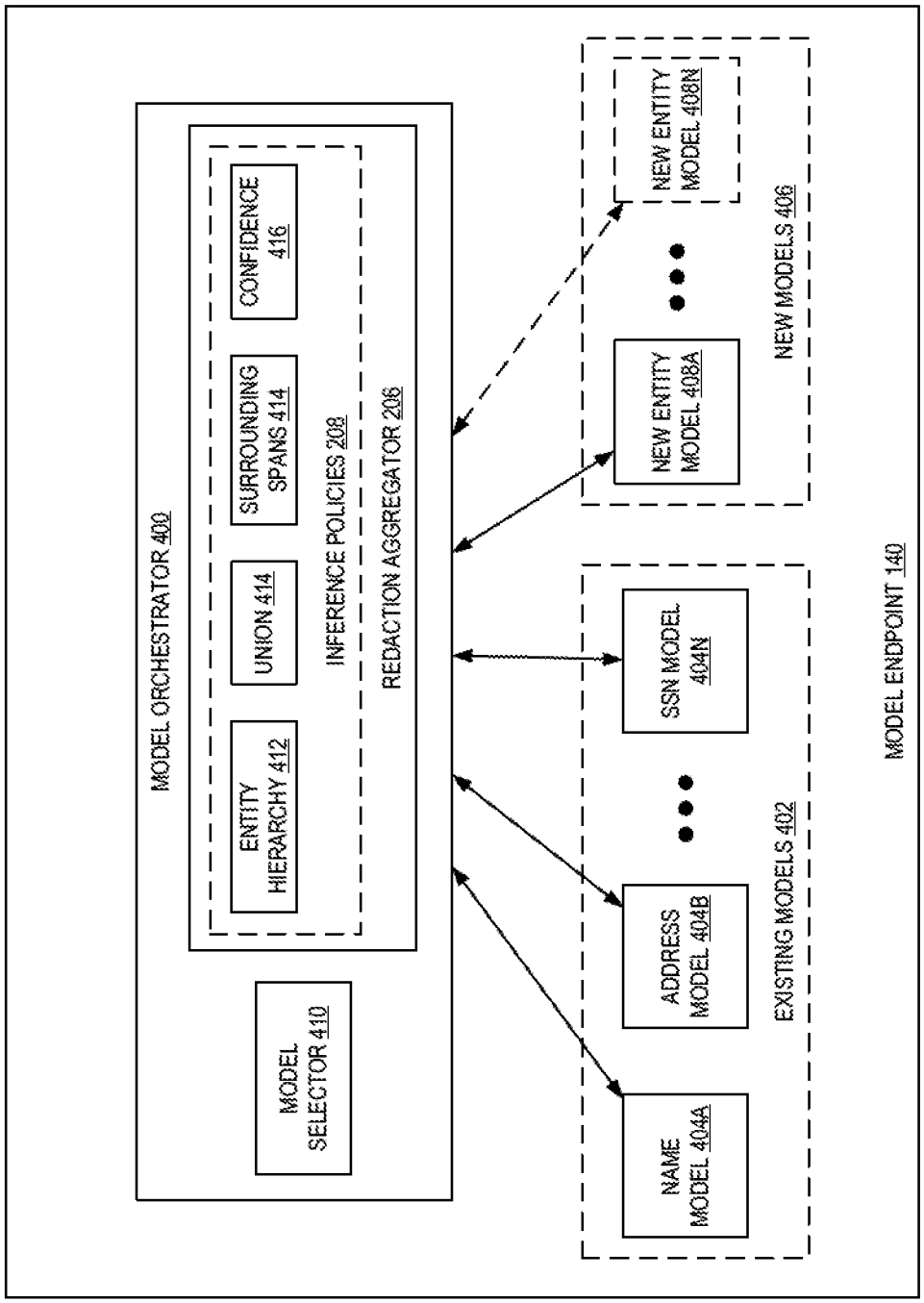
FIG. 4 is a diagram illustrating a model endpoint which can host new models to extend sensitive data tagging to new entities according to some embodiments.

FIG. 4 is a diagram illustrating a model endpoint which can host new models to extend sensitive data tagging to new entities according to some embodiments. As shown in FIG. 4, model endpoint 140 may include a model orchestrator 400. When a transcript (or a portion of a transcript) is received at model endpoint 140, model orchestrator 400 can manage distributing that content to a plurality of models hosted by the model endpoint, including existing models 402 and any newly added models 406. As discussed, each model is trained to identify one sensitive data type. For example, model 404A may be trained to identify name entities, model 404B may be trained to identify address entities, model 404N may be trained to identify social security number entities, etc. When new models are added, these are added to identify new entities that were not previously supported by the existing models 402. For example, new entity model 408A may be trained to identify account number entities, and new entity model 408N may be trained to identify credit card number entities, etc.

Model selector 410 can scatter all or portions of the transcript to the models to perform inference. In some embodiments, the models used may depend on the transcription request and/or based on user preferences. For example, if the user in the initial transcription job request specifies that only a subset of sensitive data types is to be redacted, the model selector may send the transcript to only the models corresponding to that subset. The models can process the transcript (or portions thereof) in parallel and redaction aggregator 408 can merge the results from the models. Redaction aggregator 206 can merge the results using inference policies 208. In some embodiments, inference policies 208 may include an entity hierarchy policy 412. Entity hierarchy policy 412 can define a hierarchy of entities which may be used to resolve conflicts where a span is tagged multiple times. For example, "address" may be defined to be hierarchically superior to "age", so if a span is tagged with both address and age, age will be discarded. Inference policies 208 may also include a union policy 414. Union policy 414 may redact the largest tagged span where tags overlap, and retain all of the conflicting tags.

Inference policies 208 may include a surrounding spans policy, tags associated with a number of spans on either side of the span with the conflict may be reviewed to determine if the context suggests selecting one of the tags. For example, if the text reads "Sravan, working at 1800 9 th Avenue lives in Seattle", and the span "9" is tagged as both an age entity and an address entity, the inference policy may review the spans "1800", "th", and "Avenue", which are tagged as address entities. Because the conflicted span (e.g., "9") is surrounded by address entities, the address tag may be adopted to resolve the conflict. In some embodiments, such a policy may be applied if the confidence scores of the conflicting tags are within a threshold difference, and the policy may define a number of spans to review on either side of the conflicted span. Inference policies 208 may include a maximum confidence policy 416 which may select the tag with the higher confidence score to resolve the conflict. In some embodiments, probability calibration can be performed on the confidence scores of the conflicting tags to ensure the probabilities are normalized. For example, the estimates provided by different types of models vary in quality. Probability calibration techniques can be used to normalize the confidence scores so that they can be effectively compared. The policy used may vary by user and may be selected based on user preferences, based on an instruction in the start transcription request, or by other user input. In some embodiments, a default policy may be used where no input is provided. For example, the maximum confidence policy 416 may be adopted as the default policy.

In some embodiments, model endpoint 118 may also host a plurality of rules which can be applied to the transcript. These rules can be applied in parallel with the models, after the models have been applied (e.g., to low confidence entities), or before the models have been applied. In some embodiments, the rules may include rules identifying particular sequences with types of sensitive data. For example, a rule may define a sixteen digit entity as a credit card number, and another rule may define a nine digit entity as a social security number. Rules may also define sensitive data types, for example a rule may define an email address as a sequence including "string"+"@"+"string"+".com". The rules may implement string searching algorithms to identify the pattern within the transcript.

Figure 5:
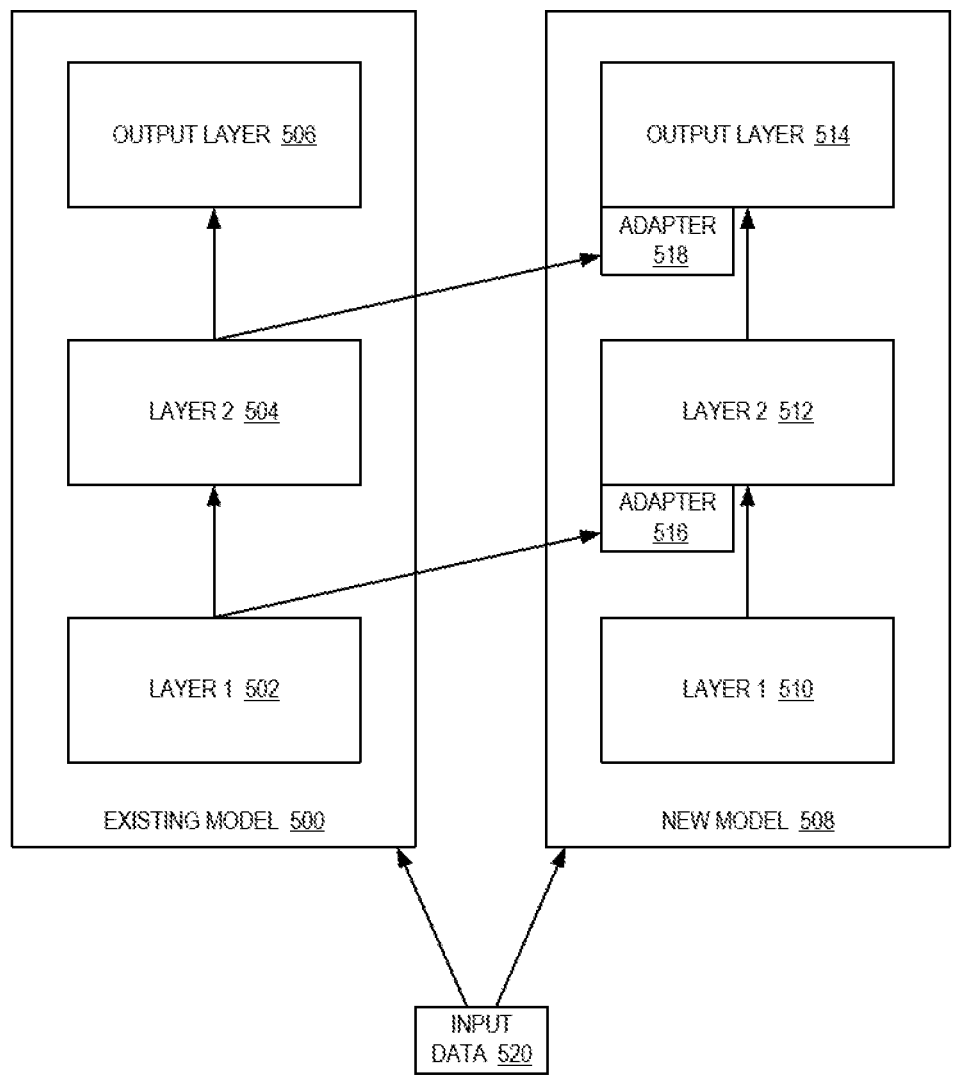
FIG. 5 is a diagram illustrating an example of using adapters to tune a new model based on an existing model according to some embodiments.

FIG. 5 is a diagram illustrating an example of using adapters to tune a new model based on an existing model according to some embodiments. In some embodiments, transfer learning may be used to generate a new model while leveraging the existing model(s). New model 508 can be a progressive neural network, which can be trained on a new set of training data, as described above, and adapters associated with layers of the new model can receive data from layers of the existing model(s) when processing input data 520. For example, existing model 500 may include a plurality of layers, including layer 1 502, layer 2, 504, and output layer 506. In various embodiments the model may include more or fewer layers than those depicted. To solve a new problem, such as identify a new sensitive data entity, a new model 508 can be created that include adapters 516 and 518 on one or more of its layers. Progressive neural networks allow for knowledge to be transferred from one model to another to perform different tasks. The adapters enable prior knowledge from other models (e.g., existing model 500) to be incorporated into layers of the new model. These adapters may also be neural networks that learn how to tune data received from the existing model(s) to best identify the new entity. This enables the new model to leverage the past knowledge of the existing model(s) and fine-tune the new model while not having to re-train older models. Since the adapters can be small or only for selective layers, the new model does not have to maintain a full copy of the shared weights for every new model that is created.

Figure 6:
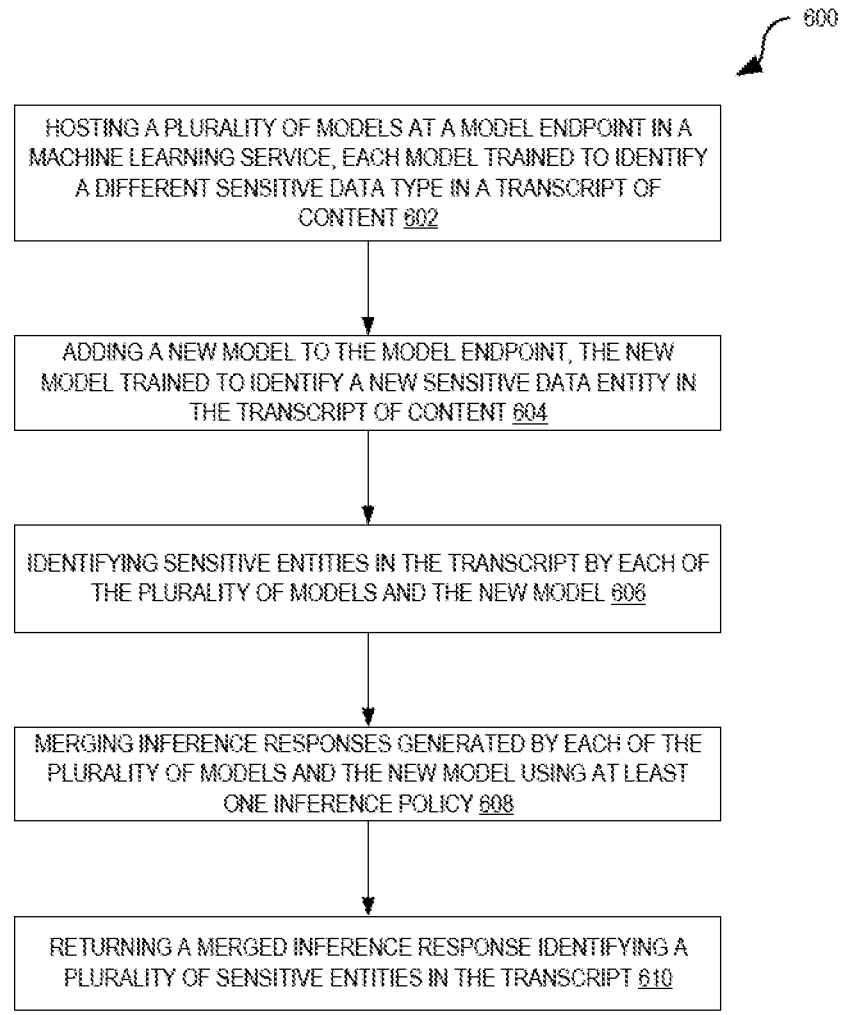
FIG. 6 is a flow diagram illustrating operations of a method for extending sensitive data tagging without reannotating training data according to some embodiments.

FIG. 6 is a flow diagram illustrating operations 600 of a method for extending sensitive data tagging without reannotating training data according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by transcription service 102 and/or machine learning service 103 of the other figures.

The operations 600 include, at block 602, hosting a plurality of models at a model endpoint in a machine learning service, each model trained to identify a different sensitive data type in a transcript of content. In some embodiments, the content includes an audio file or an image file. The operations 600 include, at block 604, adding a new model to the model endpoint, the new model trained to identify a new sensitive data entity in the transcript of content. In some embodiments, the new model is trained using a new training dataset labeled with the new sensitive data entity. In some embodiments, the new model is a progressive neural network including at least one adapter on at least one layer of the new model that receives information from at least one layer of one of the plurality of models at the model endpoint.

The operations 600 include, at block 606, identifying sensitive entities in the transcript by each of the plurality of models and the new model. In some embodiments, the operations may further include updating an application programming interface to include redaction of the new sensitive data entity.

The operations 600 include, at block 608, merging inference responses generated by each of the plurality of models and the new model using at least one inference policy. In some embodiments, merging inference responses generated by each of the plurality of models and the new model using at least one inference policy may further include determining a span has been tagged by at least two models from the plurality of models and the new model, and performing probability calibration on the at least two models. In some embodiments, the operations may further include determining a tag from a first model is associated with a highest confidence score after probability calibration, and discarding tags from any remaining models from the at least two models.

In some embodiments, merging inference responses generated by each of the plurality of models and the new model using at least one inference policy may further include determining a span has been tagged by at least two models from the plurality of models and the new model, determining a superior tag based at least on an entity hierarchy inference policy, and discarding any inferior tags.

In some embodiments, merging inference responses generated by each of the plurality of models and the new model using at least one inference policy may further include determining at least two overlapping spans have been tagged by at least two models from the plurality of models and the new model, combining the at least two overlapping spans into a single entity, and associating the single entity with tags from the at least two models.

In some embodiments, merging inference responses generated by each of the plurality of models and the new model using at least one inference policy may further include determining a first span in the transcript has been tagged by at least two models from the plurality of models and the new model, identifying tags associated with one or more spans on either side of the first span in the transcript, and assigning at tag to the first span based at least on the tags associated with the one or more spans.

The operations 600 include, at block 610, returning a merged inference response identifying a plurality of sensitive entities in the transcript. In some embodiments, the operations may further include generating a redacted transcript based at least on the merged inference response.

In some embodiments, the operations may include hosting a plurality of models at a model endpoint in a machine learning service, each model trained to identify a different sensitive data type in a transcript of audio content, extending the plurality of models to identify a new sensitive data type by training a new model to identify the new sensitive data type and deploying the new model to the model endpoint, the new model trained using a different set of training data than was used to train the plurality of models, receiving a transcript of the audio content, identifying sensitive entities in the transcript by each of the plurality of models and the new model in parallel, merging inference responses generated by each of the plurality of models and the new model using at least one inference policy, and returning a merged inference response identifying a plurality of sensitive entities in the transcript, wherein a transcription service uses the merged inference response to identify a plurality of spans in the transcript corresponding to the plurality of sensitive entities and redacts the plurality of spans from the transcript to generate a redacted transcript. In some embodiments, the inference policy includes at least one of an entity hierarchy policy, a union policy, a surrounding spans policy, or a highest confidence policy. In some embodiments, the different sensitive data types include one or more of personally identifying information (PII), protected health information (PHI), or payment card information (PCI).

Figure 7:
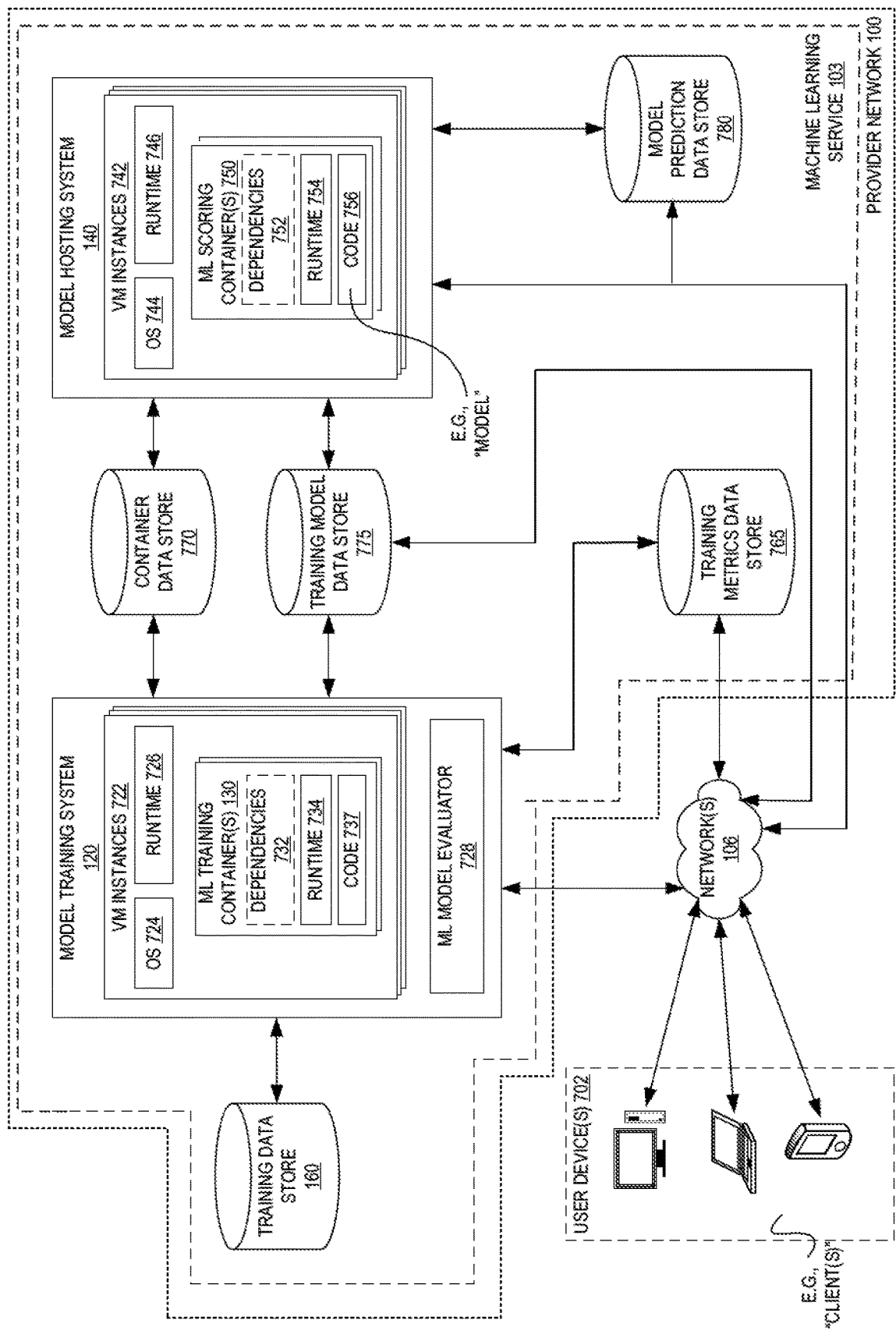
FIG. 7 is a block diagram of an illustrative operating environment in which machine learning models are trained and hosted according to some embodiments.

FIG. 7 is a block diagram of an illustrative operating environment in which machine learning models are trained and hosted according to some embodiments. The operating environment includes end user devices 702 (for example, computing devices(s), edge device(s), etc.), a model training system 120, a model hosting system 140, a training data store 160, a training metrics data store 765, a container data store 770, a training model data store 775, and a model prediction data store 780.

A machine learning service 103 described herein may include one or more of these entities, such as the model hosting system 140, model training system 120, and so forth. In some embodiments, users, by way of user devices 702, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 702 and the model training system 120 (or provider network 100), and/or between components of the model training system 120 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 702 can interact with the model training system 120 via frontend 729 of the model training system 120. For example, a user device 702 can provide a training request to the frontend 729 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 702, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 702 may provide, in the training request, an algorithm written in any programming language. The model training system 120 then packages the algorithm into a container (optionally with other code, such as a "base" ML algorithm supplemented with user-provided code) that is eventually loaded into a virtual machine instance 722 for training a machine learning model, as described in greater detail below. For example, a user, via a user device 702, may develop an algorithm/code using an application (for example, an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 702 provides, in the training request, an indicator of a container image (for example, an indication of an address or a location at which a container image is stored). For example, the container image can be stored in a container data store 770, and this container image may have been previously created/uploaded by the user. The model training system 120 can retrieve the container image from the indicated location and create a container using the retrieved container image. The container is then loaded into a virtual machine instance 722 for training a machine learning model, as described in greater detail below.

The model training system 120 can use the information provided by the user device 702 to train a machine learning model in one or more pre-established virtual machine instances 722 in some embodiments. In particular, the model training system 120 includes a single physical computing device or multiple physical computing devices that are interconnected using one or more computing networks (not shown), where the physical computing device(s) host one or more virtual machine instances 722. The model training system 120 can handle the acquisition and configuration of compute capacity (for example, containers, instances, etc., which are described in greater detail below) based on the information describing the computing machine on which to train a machine learning model provided by the user device 702. The model training system 120 can then train machine learning models using the compute capacity, as is described in greater detail below. The model training system 120 can automatically scale up and down based on the volume of training requests received from user devices 702 via frontend 729, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 722 are utilized to execute tasks. For example, such tasks can include training a machine learning model. As shown in FIG. 7, each virtual machine instance 722 includes an operating system (OS) 724, a language runtime 726, and one or more ML training containers 730. Generally, the ML training containers 730 are logical units created within a virtual machine instance using the resources available on that instance and can be utilized to isolate execution of a task from other processes (for example, task executions) occurring in the instance. In some embodiments, the ML training containers 730 are formed from one or more container images and a top container layer. Each container image may further include one or more image layers, where each image layer represents an executable instruction. As described above, some or all of the executable instructions together represent an algorithm that defines a machine learning model. Changes made to the ML training containers 730 (for example, creation of new files, modification of existing files, deletion of files, etc.) are stored in the top container layer. If a ML training container 730 is deleted, the top container layer is also deleted. However, the container image(s) that form a portion of the deleted ML training container 730 can remain unchanged. The ML training containers 730 can be implemented, for example, as Linux containers (LXC), Docker containers, and the like.

The ML training containers 730 may include individual a runtime 734, code 737, and dependencies 732 needed by the code 737 in some embodiments. The runtime 734 can be defined by one or more executable instructions that form at least a portion of a container image that is used to form the ML training container 730 (for example, the executable instruction(s) in the container image that define the operating system and/or runtime to run in the container formed from the container image). The code 737 includes one or more executable instructions that form at least a portion of a container image that is used to form the ML training container 730. For example, the code 737 includes the executable instructions in the container image that represent an algorithm that defines a machine learning model, which may reference (or utilize) code or libraries from dependencies 732. The runtime 734 is configured to execute the code 737 in response to an instruction to begin machine learning model training Execution of the code 737 results in the generation of model data, as described in greater detail below.

In some embodiments, the code 737 includes executable instructions that represent algorithms that define different machine learning models. For example, the code 737 includes one set of executable instructions that represent a first algorithm that defines a first machine learning model and a second set of executable instructions that represent a second algorithm that defines a second machine learning model. In some embodiments, the virtual machine instance 722 executes the code 737 and trains all of the machine learning models. In some embodiments, the virtual machine instance 722 executes the code 737, selecting one of the machine learning models to train. For example, the virtual machine instance 722 can identify a type of training data indicated by the training request and select a machine learning model to train (for example, execute the executable instructions that represent an algorithm that defines the selected machine learning model) that corresponds with the identified type of training data.

In some embodiments, the runtime 734 is the same as the runtime 726 utilized by the virtual machine instance 722. In some embodiments, the runtime 734 is different than the runtime 726 utilized by the virtual machine instance 722.

In some embodiments, the model training system 120 uses one or more container images included in a training request (or a container image retrieved from the container data store 770 in response to a received training request) to create and initialize a ML training container 730 in a virtual machine instance 722. For example, the model training system 120 creates a ML training container 730 that includes the container image(s) and/or a top container layer.

Prior to beginning the training process, in some embodiments, the model training system 120 retrieves training data from the location indicated in the training request. For example, the location indicated in the training request can be a location in the training data store 160. Thus, the model training system 120 retrieves the training data from the indicated location in the training data store 160. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 722 training the machine learning model. Once the virtual machine instance 722 has applied and used the retrieved portion or once the virtual machine instance 722 is about to use all of the retrieved portion (for example, a buffer storing the retrieved portion is nearly empty), then the model training system 120 can retrieve a second portion of the training data and provide the second retrieved portion to the virtual machine instance 722, and so on.

To perform the machine learning model training, the virtual machine instance 722 executes code 737 stored in the ML training container 730 in some embodiments. For example, the code 737 includes some or all of the executable instructions that form the container image of the ML training container 730 initialized therein. Thus, the virtual machine instance 722 executes some or all of the executable instructions that form the container image of the ML training container 730 initialized therein to train a machine learning model. The virtual machine instance 722 executes some or all of the executable instructions according to the hyperparameter values included in the training request. As an illustrative example, the virtual machine instance 722 trains a machine learning model by identifying values for certain parameters (for example, coefficients, weights, centroids, etc.). The identified values depend on hyperparameters that define how the training is performed. Thus, the virtual machine instance 722 can execute the executable instructions to initiate a machine learning model training process, where the training process is run using the hyperparameter values included in the training request. Execution of the executable instructions can include the virtual machine instance 722 applying the training data retrieved by the model training system 120 as input parameters to some or all of the instructions being executed.

In some embodiments, executing the executable instructions causes the virtual machine instance 722 (for example, the ML training container 730) to generate model data. For example, the ML training container 730 generates model data and stores the model data in a file system of the ML training container 730. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 730 such that the model data is written to the top container layer of the ML training container 730 and/or the container image(s) that forms a portion of the ML training container 730 is modified to include the model data.

The virtual machine instance 722 (or the model training system 120 itself) pulls the generated model data from the ML training container 730 and stores the generated model data in the training model data store 775 in an entry associated with the virtual machine instance 722 and/or the machine learning model being trained. In some embodiments, the virtual machine instance 722 generates a single file that includes model data and stores the single file in the training model data store 775. In some embodiments, the virtual machine instance 722 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 722 can package the multiple files into a single file once training is complete and store the single file in the training model data store 775. Alternatively, the virtual machine instance 722 stores the multiple files in the training model data store 775. The virtual machine instance 722 stores the file(s) in the training model data store 775 while the training process is ongoing and/or after the training process is complete.

In some embodiments, the virtual machine instance 722 regularly stores model data file(s) in the training model data store 775 as the training process is ongoing. Thus, model data file(s) can be stored in the training model data store 775 at different times during the training process. Each set of model data files corresponding to a particular time or each set of model data files present in the training model data store 775 as of a particular time could be checkpoints that represent different versions of a partially-trained machine learning model during different stages of the training process. Accordingly, before training is complete, a user, via the user device 702 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 775.

In some embodiments, a virtual machine instance 722 executes code 737 stored in a plurality of ML training containers 730. For example, the algorithm included in the container image can be in a format that allows for the parallelization of the training process. Thus, the model training system 120 can create multiple copies of the container image provided in a training request and cause the virtual machine instance 722 to load each container image copy in a separate ML training container 730. The virtual machine instance 722 can then execute, in parallel, the code 737 stored in the ML training containers 730. The virtual machine instance 722 can further provide configuration information to each ML training container 730 (for example, information indicating that N ML training containers 730 are collectively training a machine learning model and that a particular ML training container 730 receiving the configuration information is ML training container 730 number X of N), which can be included in the resulting model data. By parallelizing the training process, the model training system 120 can significantly reduce the training time in some embodiments.

In some embodiments, a plurality of virtual machine instances 722 execute code 737 stored in a plurality of ML training containers 730. For example, the resources used to train a particular machine learning model can exceed the limitations of a single virtual machine instance 722. However, the algorithm included in the container image can be in a format that allows for the parallelization of the training process. Thus, the model training system 120 can create multiple copies of the container image provided in a training request, initialize multiple virtual machine instances 722, and cause each virtual machine instance 722 to load a container image copy in one or more separate ML training containers 730. The virtual machine instances 722 can then each execute the code 737 stored in the ML training containers 730 in parallel. The model training system 120 can further provide configuration information to each ML training container 730 via the virtual machine instances 722 (for example, information indicating that N ML training containers 730 are collectively training a machine learning model and that a particular ML training container 730 receiving the configuration information is ML training container 730 number X of N, information indicating that M virtual machine instances 722 are collectively training a machine learning model and that a particular ML training container 730 receiving the configuration information is initialized in virtual machine instance 722 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 722 that execute the code 737. Thus, the parallelization can occur over different physical computing devices in addition to over different virtual machine instances 722 and/or ML training containers 730.

In some embodiments, the model training system 120 includes a ML model evaluator 728. The ML model evaluator 728 can monitor virtual machine instances 722 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 728 can obtain the model data for a machine learning model being trained and evaluation data from the training data store 160. The evaluation data is separate from the data used to train a machine learning model and includes both input data and expected outputs (for example, known results), and thus the ML model evaluator 728 can define a machine learning model using the model data and execute the machine learning model by providing the input data as inputs to the machine learning model. The ML model evaluator 728 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 728 periodically generates model metrics during the training process and stores the model metrics in the training metrics data store 765 in some embodiments. While the machine learning model is being trained, a user, via the user device 702, can access and retrieve the model metrics from the training metrics data store 765. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 702, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 722 to optionally delete an existing ML training container 730, create and initialize a new ML training container 730 using some or all of the information included in the request, and execute the code 737 stored in the new ML training container 730 to restart the machine learning model training process. As another example, the model training system 120 can cause the virtual machine instance 722 to modify the execution of code stored in an existing ML training container 730 according to the data provided in the modification request. In some embodiments, the user, via the user device 702, can transmit a request to the model training system 120 to stop the machine learning model training process. The model training system 120 can then instruct the virtual machine instance 722 to delete the ML training container 730 and/or to delete any model data stored in the training model data store 775.

As described below, in some embodiments, the model data stored in the training model data store 775 is used by the model hosting system 140 to deploy machine learning models. Alternatively, or additionally, a user device 702 or another computing device (not shown) can retrieve the model data from the training model data store 775 to implement a learning algorithm in an external device. As an illustrative example, a robotic device can include sensors to capture input data. A user device 702 can retrieve the model data from the training model data store 775 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 722 are shown in FIG. 7 as a single grouping of virtual machine instances 722, some embodiments of the present application separate virtual machine instances 722 that are actively assigned to execute tasks from those virtual machine instances 722 that are not actively assigned to execute tasks. For example, those virtual machine instances 722 actively assigned to execute tasks are grouped into an "active pool," while those virtual machine instances 722 not actively assigned to execute tasks are placed within a "warming pool." In some embodiments, those virtual machine instances 722 within the warming pool can be pre-initialized with an operating system, language runtimes, and/or other software required to enable rapid execution of tasks (for example, rapid initialization of machine learning model training in ML training container(s) 730) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model hosting system 140, etc.). The processing unit can also communicate to and from a memory of a virtual machine instance 722 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 742. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 702 via frontend of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 742 are utilized to execute tasks. For example, such tasks can include executing a machine learning model. As shown in FIG. 7, each virtual machine instance 742 includes an operating system (OS) 744, a language runtime 746, and one or more ML scoring containers 750. The ML scoring containers 750 are similar to the ML training containers 730 in that the ML scoring containers 750 are logical units created within a virtual machine instance using the resources available on that instance and can be utilized to isolate execution of a task from other processes (for example, task executions) occurring in the instance. In some embodiments, the ML scoring containers 750 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 750 (for example, creation of new files, modification of existing files, deletion of files, etc.) are stored in the top container layer. If a ML scoring container 750 is deleted, the top container layer is also deleted. However, the container image(s) that form a portion of the deleted ML scoring container 750 can remain unchanged. The ML scoring containers 750 can be implemented, for example, as Linux containers.

The ML scoring containers 750 each include a runtime 754, code 756, and dependencies 752 (for example, supporting software such as libraries) needed by the code 756 in some embodiments. The runtime 754 can be defined by one or more executable instructions that form at least a portion of a container image that is used to form the ML scoring container 750 (for example, the executable instruction(s) in the container image that define the operating system and/or runtime to run in the container formed from the container image). The code 756 includes one or more executable instructions that form at least a portion of a container image that is used to form the ML scoring container 750. For example, the code 756 includes the executable instructions in the container image that represent an algorithm that defines a machine learning model, which may reference dependencies 752. The code 756 can also include model data that represent characteristics of the defined machine learning model, as described in greater detail below. The runtime 754 is configured to execute the code 756 in response to an instruction to begin execution of a machine learning model. Execution of the code 756 results in the generation of outputs (for example, predicted results), as described in greater detail below.

In some embodiments, the runtime 754 is the same as the runtime 746 utilized by the virtual machine instance 742. In some embodiments, runtime 754 is different than the runtime 746 utilized by the virtual machine instance 742.

In some embodiments, the model hosting system 140 uses one or more container images included in a deployment request (or a container image retrieved from the container data store 770 in response to a received deployment request) to create and initialize a ML scoring container 750 in a virtual machine instance 742. For example, the model hosting system 140 creates a ML scoring container 750 that includes the container image(s) and/or a top container layer.

As described above, a user device 702 can submit a deployment request and/or an execution request to the model hosting system 140 via the frontend in some embodiments. A deployment request causes the model hosting system 140 to deploy a trained machine learning model into a virtual machine instance 742. For example, the deployment request can include an identification of an endpoint (for example, an endpoint name, such as an HTTP endpoint name) and an identification of one or more trained machine learning models (for example, a location of one or more model data files stored in the training model data store 775). Optionally, the deployment request also includes an identification of one or more container images stored in the container data store 770.

Upon receiving the deployment request, the model hosting system 140 initializes ones or more ML scoring containers 750 in one or more hosted virtual machine instance 742. In embodiments in which the deployment request includes an identification of one or more container images, the model hosting system 140 forms the ML scoring container(s) 750 from the identified container image(s). For example, a container image identified in a deployment request can be the same container image used to form an ML training container 730 used to train the machine learning model corresponding to the deployment request. Thus, the code 756 of the ML scoring container(s) 750 includes one or more executable instructions in the container image(s) that represent an algorithm that defines a machine learning model. In embodiments in which the deployment request does not include an identification of a container image, the model hosting system 140 forms the ML scoring container(s) 750 from one or more container images stored in the container data store 770 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 750 by retrieving model data corresponding to the identified trained machine learning model(s) in some embodiments. For example, the deployment request can identify a location of model data file(s) stored in the training model data store 775. In embodiments in which a single model data file is identified in the deployment request, the model hosting system 140 retrieves the identified model data file from the training model data store 775 and inserts the model data file into a single ML scoring container 750, which forms a portion of code 756. In some embodiments, the model data file is archived or compressed (for example, formed from a package of individual files). Thus, the model hosting system 140 unarchives or decompresses the model data file to obtain multiple individual files and inserts the individual files into the ML scoring container 750. In some embodiments, the model hosting system 140 stores the model data file in the same location as the location in which the model data file was stored in the ML training container 730 that generated the model data file. For example, the model data file initially was stored in the top container layer of the ML training container 730 at a certain offset, and the model hosting system 140 then stores the model data file in the top container layer of the ML scoring container 750 at the same offset.

In embodiments in which multiple model data files are identified in the deployment request, the model hosting system 140 retrieves the identified model data files from the training model data store 775. The model hosting system 140 can insert the model data files into the same ML scoring container 750, into different ML scoring containers 750 initialized in the same virtual machine instance 742, or into different ML scoring containers 750 initialized in different virtual machine instances 742. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 750 with the endpoint identified in the deployment request. For example, each of the initialized ML scoring container(s) 750 can be associated with a network address. The model hosting system 140 can map the network address(es) to the identified endpoint, and the model hosting system 140 or another system (for example, a routing system, not shown) can store the mapping. Thus, a user device 702 can refer to trained machine learning model(s) stored in the ML scoring container(s) 750 using the endpoint. This allows for the network address of an ML scoring container 750 to change without causing the user operating the user device 702 to change the way in which the user refers to a trained machine learning model.

Once the ML scoring container(s) 750 are initialized, the ML scoring container(s) 750 are ready to execute trained machine learning model(s). In some embodiments, the user device 702 transmits an execution request to the model hosting system 140 via the frontend, where the execution request identifies an endpoint and includes an input to a machine learning model (for example, a set of input data). The model hosting system 140 or another system (for example, a routing system, not shown) can obtain the execution request, identify the ML scoring container(s) 750 corresponding to the identified endpoint, and route the input to the identified ML scoring container(s) 750.

In some embodiments, a virtual machine instance 742 executes the code 756 stored in an identified ML scoring container 750 in response to the model hosting system 140 receiving the execution request. In particular, execution of the code 756 causes the executable instructions in the code 756 corresponding to the algorithm to read the model data file stored in the ML scoring container 750, use the input included in the execution request as an input parameter, and generate a corresponding output. As an illustrative example, the algorithm can include coefficients, weights, layers, cluster centroids, and/or the like. The executable instructions in the code 756 corresponding to the algorithm can read the model data file to determine values for the coefficients, weights, layers, cluster centroids, and/or the like. The executable instructions can include input parameters, and the input included in the execution request can be supplied by the virtual machine instance 742 as the input parameters. With the machine learning model characteristics and the input parameters provided, execution of the executable instructions by the virtual machine instance 742 can be completed, resulting in an output.

In some embodiments, the virtual machine instance 742 stores the output in the model prediction data store 780. Alternatively, or in addition, the virtual machine instance 742 transmits the output to the user device 702 that submitted the execution result via the frontend.

In some embodiments, the execution request corresponds to a group of related trained machine learning models. Thus, the ML scoring container 750 can transmit the output to a second ML scoring container 750 initialized in the same virtual machine instance 742 or in a different virtual machine instance 742. The virtual machine instance 742 that initialized the second ML scoring container 750 can then execute second code 756 stored in the second ML scoring container

750, providing the received output as an input parameter to the executable instructions in the second code 756. The second ML scoring container 750 further includes a model data file stored therein, which is read by the executable instructions in the second code 756 to determine values for the characteristics defining the machine learning model. Execution of the second code 756 results in a second output. The virtual machine instance 742 that initialized the second ML scoring container 750 can then transmit the second output to the model prediction data store 780 and/or the user device 702 via the frontend (for example, if no more trained machine learning models are needed to generate an output) or transmit the second output to a third ML scoring container 750 initialized in the same or different virtual machine instance 742 (for example, if outputs from one or more additional trained machine learning models are needed), and the above-referenced process can be repeated with respect to the third ML scoring container 750.

While the virtual machine instances 742 are shown in FIG. 7 as a single grouping of virtual machine instances 742, some embodiments of the present application separate virtual machine instances 742 that are actively assigned to execute tasks from those virtual machine instances 742 that are not actively assigned to execute tasks. For example, those virtual machine instances 742 actively assigned to execute tasks are grouped into an "active pool," while those virtual machine instances 742 not actively assigned to execute tasks are placed within a "warming pool." In some embodiments, those virtual machine instances 742 within the warming pool can be pre-initialized with an operating system, language runtimes, and/or other software required to enable rapid execution of tasks (for example, rapid initialization of ML scoring container(s) 750, rapid execution of code 756 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 702, the model training system 120, etc.). The processing unit can also communicate to and from a memory of a virtual machine instance 742 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 7 are not meant to be limiting. For example, the model training system 120 and/or the model hosting system 140 could also operate within a computing environment having a fewer or greater number of devices than are illustrated in FIG. 7. Thus, the depiction of the model training system 120 and/or the model hosting system 140 in FIG. 7 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 729 processes all training requests received from user devices 702 and provisions virtual machine instances 722. In some embodiments, the frontend 729 serves as a front door to all the other services provided by the model training system 120. The frontend 729 processes the requests and makes sure that the requests are properly authorized. For example, the frontend 729 may determine whether the user associated with the training request is authorized to initiate the training process.

Similarly, frontend processes all deployment and execution requests received from user devices 702 and provisions virtual machine instances 742. In some embodiments, the frontend serves as a front door to all the other services provided by the model hosting system 140. The frontend processes the requests and makes sure that the requests are properly authorized. For example, the frontend may determine whether the user associated with a deployment request or an execution request is authorized to access the indicated model data and/or to execute the indicated machine learning model.

The training data store 160 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 160 is depicted as being located external to the model training system 120 and the model hosting system 140, this is not meant to be limiting. For example, in some embodiments not shown, the training data store 160 is located internal to at least one of the model training system 120 or the model hosting system 140.

In some embodiments, the training metrics data store 765 stores model metrics. While the training metrics data store 765 is depicted as being located external to the model training system 120 and the model hosting system 140, this is not meant to be limiting. For example, in some embodiments not shown, the training metrics data store 765 is located internal to at least one of the model training system 120 or the model hosting system 140.

The container data store 770 stores container images, such as container images used to form ML training containers 730 and/or ML scoring containers 750, that can be retrieved by various virtual machine instances 722 and/or 742. While the container data store 770 is depicted as being located external to the model training system 120 and the model hosting system 140, this is not meant to be limiting. For example, in some embodiments not shown, the container data store 770 is located internal to at least one of the model training system 120 and the model hosting system 140.

The training model data store 775 stores model data files. In some embodiments, some of the model data files are comprised of a single file, while other model data files are packages of multiple individual files. While the training model data store 775 is depicted as being located external to the model training system 120 and the model hosting system 140, this is not meant to be limiting. For example, in some embodiments not shown, the training model data store 775 is located internal to at least one of the model training system 120 or the model hosting system 140.

The model prediction data store 780 stores outputs (for example, execution results) generated by the ML scoring containers 750 in some embodiments. While the model prediction data store 780 is depicted as being located external to the model training system 120 and the model hosting system 140, this is not meant to be limiting. For example, in some embodiments not shown, the model prediction data store 780 is located internal to at least one of the model training system 120 and the model hosting system 140.

While the model training system 120, the model hosting system 140, the training data store 160, the training metrics data store 765, the container data store 770, the training model data store 775, and the model prediction data store 780 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 702 via the one or more network(s) 106.

Various example user devices 702 are shown in FIG. 7, including a desktop computer, laptop, and a mobile phone, each provided by way of illustration. In general, the user devices 702 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 702 with one or more user interfaces, command-line interfaces (CLI), application programming interfaces (API), and/or other programmatic interfaces for submitting training requests, deployment requests, and/or execution requests. In some embodiments, the user devices 702 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 8:
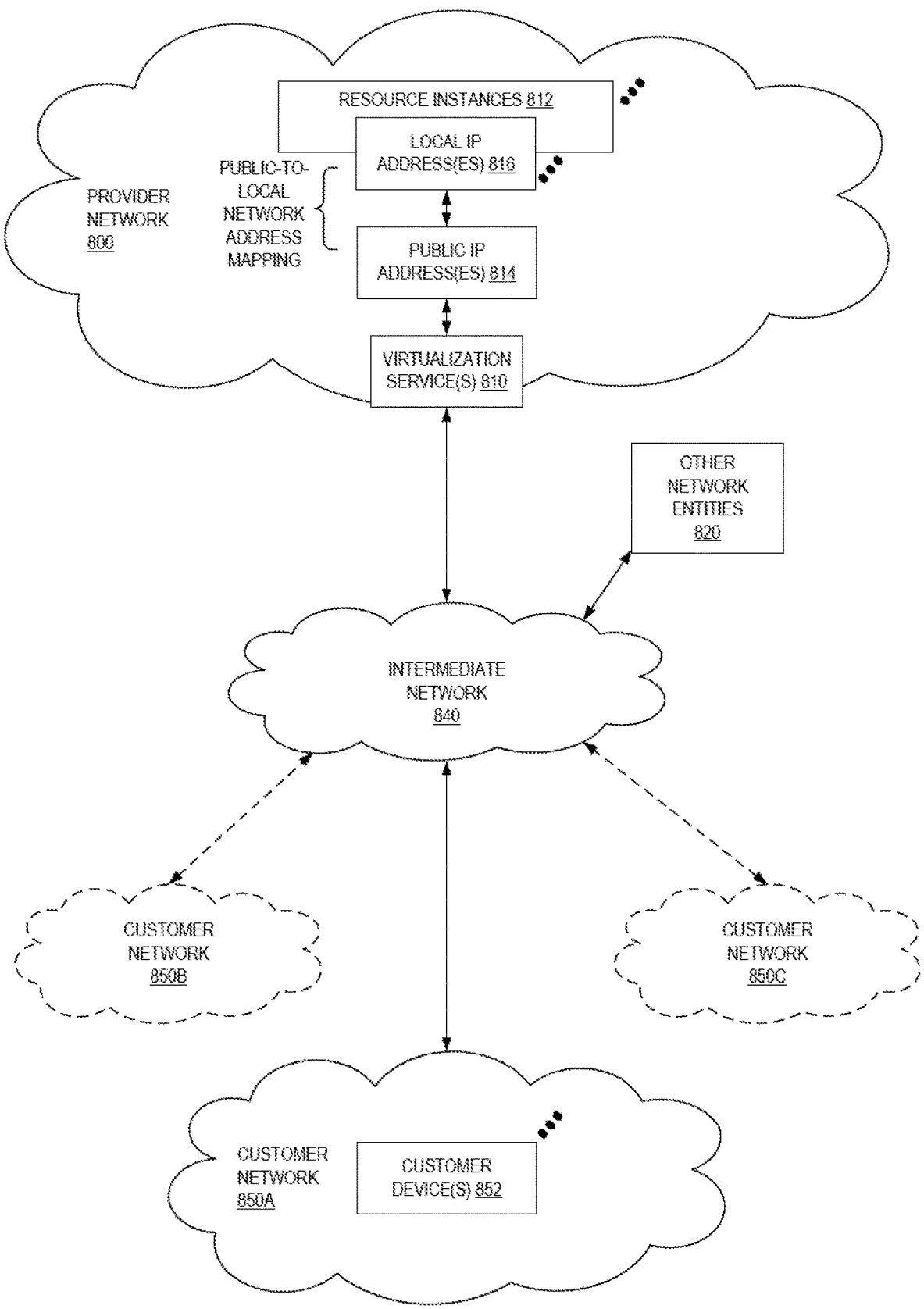
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
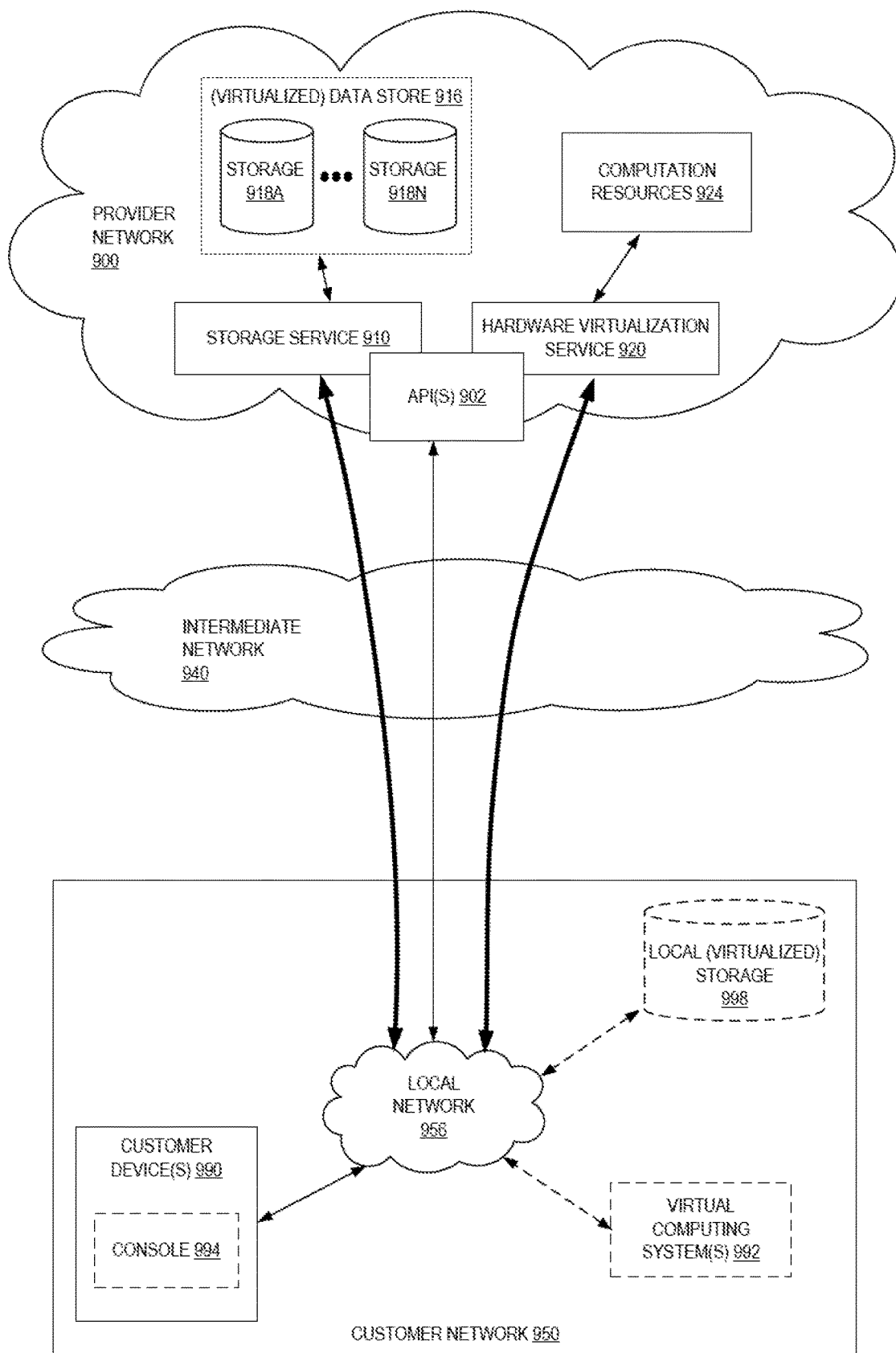
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
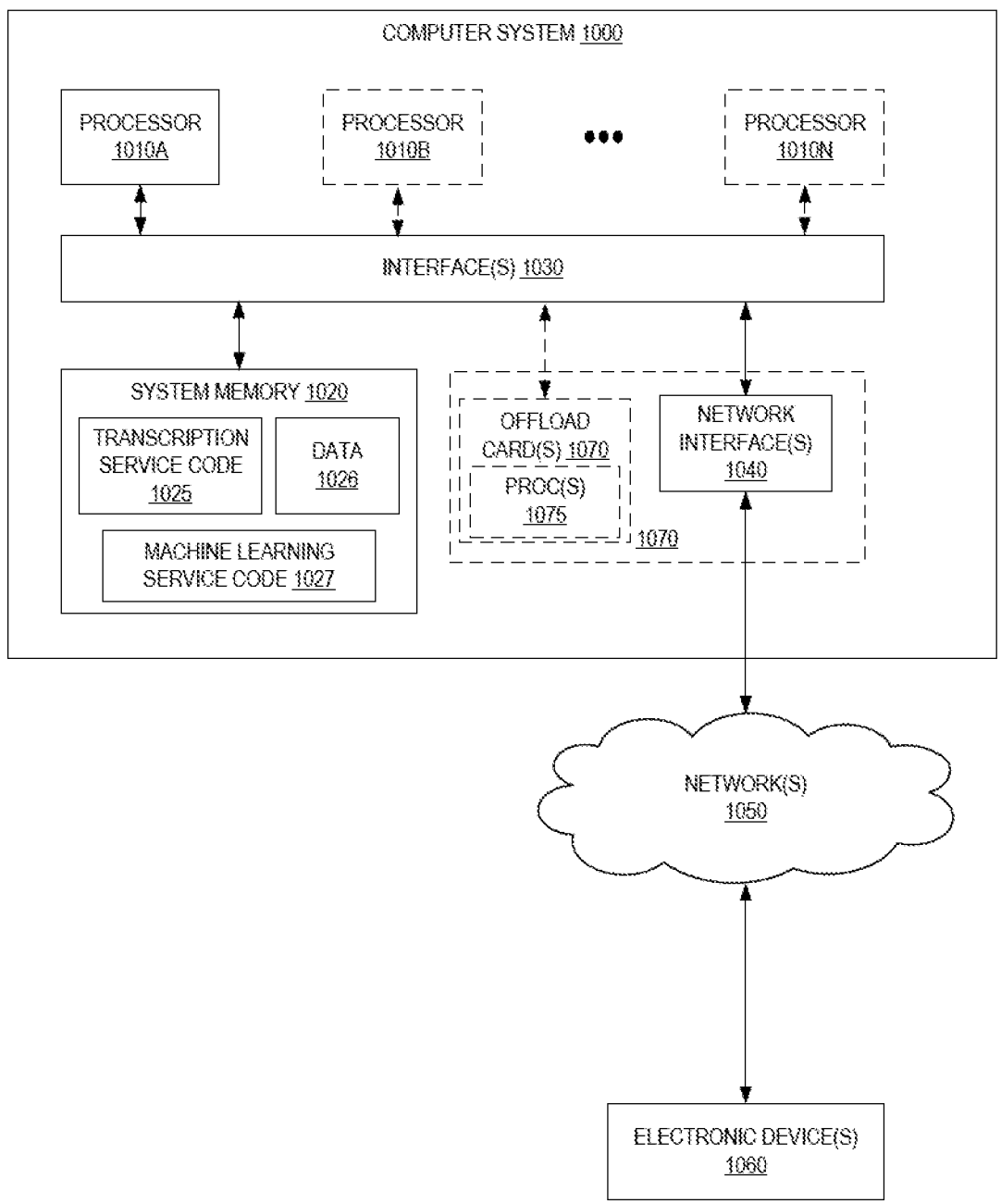
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as transcription service code 1025, machine learning service code 1027, and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
hosting a plurality of models at a model endpoint in a machine learning service, each model of the plurality of models corresponding to a different type of sensitive data that is to be redacted from a transcript of audio content;
extending the plurality of models to identify a new type of sensitive data by training a new model to identify the new type of sensitive data and deploying the new model to the model endpoint, the new model trained using a different set of training data than was used to train the plurality of models;

receiving the transcript of the audio content;

identifying, by each of the plurality of models and the new model in parallel, sensitive data entities in the transcript;

merging inference responses generated by each of the plurality of models and the new model using at least one inference policy, the inference responses from each of the plurality of models corresponding to respective ones of the different types of sensitive data, the inference responses from the new model corresponding to the new type of sensitive data; and returning a merged inference response identifying the sensitive data entities in the transcript, wherein a transcription service uses the merged inference response to identify a plurality of spans in the transcript corresponding to the sensitive data entities and redacts the plurality of spans from the transcript to generate a redacted transcript.

2. The computer-implemented method of claim 1, wherein the at least one inference policy includes at least one of an entity hierarchy policy, a union policy, a surrounding spans policy, or a highest confidence policy.

3. The computer-implemented method of claim 2, wherein the different types of sensitive data include one or more of personally identifying information (PII), protected health information (PHI), or payment card information (PCI).

4. A computer-implemented method comprising:

hosting a plurality of models at a model endpoint in a machine learning service, each model of the plurality of models corresponding to a different type of sensitive data that is to be redacted from a transcript of content;

adding a new model to the model endpoint, the new model trained to identify a new type of sensitive data in the transcript of content;

identifying, by each of the plurality of models and the new model, sensitive data entities in the transcript of content;

merging inference responses generated by each of the plurality of models and the new model using at least one inference policy, the inference responses from each of the plurality of models corresponding to respective ones of the different types of sensitive data, the inference responses from the new model corresponding to the new type of sensitive data; and returning a merged inference response identifying the sensitive data entities in the transcript of content.

5. The computer-implemented method of claim 4, further comprising generating a redacted transcript based at least on the merged inference response.

6. The computer-implemented method of claim 4, wherein the new model is trained using a new training dataset labeled with the new type of sensitive data.

7. The computer-implemented method of claim 4, further comprising updating an application programming interface to include redaction of the new type of sensitive data.

8. The computer-implemented method of claim 4, wherein merging inference responses generated by each of the plurality of models and the new model using at least one inference policy further comprises:

determining a span has been tagged by at least two models from the plurality of models and the new model; and performing probability calibration on the at least two models.

9. The computer-implemented method of claim 8, further comprising:

determining a tag from a first model from the at least two models is associated with a highest confidence score after probability calibration; and discarding tags from any remaining models from the at least two models.

10. The computer-implemented method of claim 4, wherein merging inference responses generated by each of the plurality of models and the new model using at least one inference policy further comprises:

determining a span has been tagged by at least two models from the plurality of models and the new model;

determining a superior tag based at least on an entity hierarchy inference policy; and discarding any inferior tags.

11. The computer-implemented method of claim 10, wherein merging inference responses generated by each of the plurality of models and the new model using at least one inference policy further comprises:

determining at least two overlapping spans have been tagged by at least two models from the plurality of models and the new model;

combining the at least two overlapping spans into a single entity; and associating the single entity with tags from the at least two models.

12. The computer-implemented method of claim 4, wherein merging inference responses generated by each of the plurality of models and the new model using at least one inference policy further comprises:

determining a first span in the transcript of content has been tagged by at least two models from the plurality of models and the new model;

identifying tags associated with one or more spans on either side of the first span in the transcript of content; and assigning a tag to the first span based at least on the tags associated with the one or more spans.

13. The computer-implemented method of claim 4, wherein the new model is a progressive neural network including at least one adapter on at least one layer of the new model that receives information from at least one layer of one of the plurality of models at the model endpoint.

14. The computer-implemented method of claim 4, wherein the content in the transcript of content includes an audio file or an image file.

15. A system comprising:

a transcription service implemented by a first one or more electronic devices; and a machine learning service implemented by a second one or more electronic devices, the machine learning service including instructions that upon execution cause the machine learning service to:

host a plurality of models at a model endpoint in a machine learning service, each model of the plurality of models corresponding to a different type of sensitive data that is to be redacted from a transcript of content;

add a new model to the model endpoint, the new model trained to identify a new type of sensitive data in the transcript of content;

identify, by each of the plurality of models and the new model, sensitive data entities in the transcript of content;

merge inference responses generated by each of the plurality of models and the new model using at least one inference policy, the inference responses from each of the plurality of models corresponding to respective ones of the different types of sensitive data, the inference responses from the new model corresponding to the new type of sensitive data; and return a merged inference response identifying the sensitive data entities in the transcript of content.

16. The system of claim 15, wherein the transcription service includes further instructions that upon execution cause the transcription service to:

receive the merged inference response; and generate a redacted transcript based at least on the merged inference response.

17. The system of claim 15, wherein the new model is trained using a new training dataset labeled with the new type of sensitive data.

18. The system of claim 15, wherein the instructions comprise further instructions that, when executed, further cause the machine learning service to send a request to the transcription service to update an application programming interface to include redaction of the new type of sensitive data.

19. The system of claim 15, wherein to merge inference responses generated by each of the plurality of models and the new model using at least one inference policy, the instructions comprise further instructions that, when executed, further cause the machine learning service to:

determine a span has been tagged by at least two models from the plurality of models and the new model; and perform probability calibration on the at least two models.

20. The system of claim 19, wherein the instructions comprise further instructions that, when executed, further cause the machine learning service to:

determine a tag from a first model from the at least two models is associated with a highest confidence score after probability calibration; and discard tags from any remaining models from the at least two models.

* * * * *